US 7,821,589 B2

(12) United States Patent
Park

(10) Patent No.: US 7,821,589 B2
(45) Date of Patent: Oct. 26, 2010

(54) WIRE HOLDER AND LIQUID CRYSTAL DISPLAY DEVICE HAVING THE SAME

(75) Inventor: Sang-Young Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 858 days.

(21) Appl. No.: 11/639,303

(22) Filed: Dec. 15, 2006

(65) Prior Publication Data

US 2008/0002092 A1 Jan. 3, 2008

(30) Foreign Application Priority Data

Jun. 30, 2006 (KR) ...................... 10-2006-0061179

(51) Int. Cl.
*G02F 1/1333* (2006.01)

(52) U.S. Cl. ...................................................... 349/58

(58) Field of Classification Search .............. 349/58–65
See application file for complete search history.

(56) References Cited

U.S. PATENT DOCUMENTS 6,501,642 B2 * 12/2002 Kim ...................... 361/679.26

7,116,385 B2 * 10/2006 Yeom .......................... 349/58

FOREIGN PATENT DOCUMENTS

KR 10-2005-0020248 3/2005

* cited by examiner

*Primary Examiner*—Dung T. Nguyen
(74) *Attorney, Agent, or Firm*—McKenna Long & Aldridge

(57) ABSTRACT

An LCD device having a wire holder are disclosed, in which a wire from a lamp is efficiently fixed to an inverter through a lead-out space formed at the edge of one side of a bottom cover. The LCD device has a bottom cover with bottom and lateral sides extending from the bottom, provided with a groove formed by partially cutting the bottom and the lateral sides at the edge, a light guide plate in the bottom cover, a lamp between one side of the light guide plate and one side of the bottom cover, a wire connected to both ends of the lamp and extending along the side of the bottom cover to the groove, a wire holder to which the wire is inserted to collect the wire in the groove, limiting motion of the wire, and an LCD panel arranged on the light guide plate.

10 Claims, 7 Drawing Sheets

WIRE HOLDER AND LIQUID CRYSTAL DISPLAY DEVICE HAVING THE SAME

The present disclosure relates to subject matter contained in priority Korean Patent Application No. 10-2006-061179, filed on Jun. 30, 2006, which is incorporated by reference for all purposes as if fully incorporated herein.

BACKGROUND OF THE INVENTION

1. Field of the Invention

The present invention relates to a wire holder supporting a wire between a lamp and an inverter and a liquid crystal display (LCD) device having the same, and more particularly, to a wire holder and an LCD device having the same, in which a wire is stably supported to minimize short of the wire according to motion of the LCD device and interference between the wire and an optical sheet.

2. Description of the Background Art

LCDs have become more widespread, replacing conventional cathode ray tubes (CRT) because of their advantages of thin size and light weight. The LCD device is a flat display device that displays images by controlling light transmittance to correspond to image signals. The LCD device includes an LCD panel comprised of a thin film transistor substrate, a color filter substrate, and a liquid crystal layer disposed between the two substrates. Since the LCD panel is not a light-emitting device, a back light unit is disposed at the rear of the LCD panel to supply light to a rear surface of the LCD panel.

The LCD device is divided into a direct type and an edge type depending on a position of the back light unit. The direct type LCD device includes a lamp serving as a light source, disposed on the rear surface of the LCD panel, while the edge type LCD device includes a light guide plate disposed on the rear surface of the LCD panel and a light source disposed at one side of the light guide plate. In the direct type LCD device, since a plurality of light sources are uniformly arranged at the rear of the LCD panel, improved luminance can be obtained over the edge type LCD device. However, the direct type LCD device has drawbacks in that it consumes a lot of power and is not suitable for a thin size. Meanwhile, since the edge type LCD device converts the light emitted from the light sources into plane light using the light guide plate and then supplies the plane light to the rear surface of the LCD panel, it has relatively low luminance but can reduce power consumption and is suitable for a thin size. Accordingly, the edge type LCD device is adapted for most of portable display devices, such as notebook PC, personal digital assistant (PDA) and navigator, which require a light weight and low power consumption.

A general edge type LCD device for a navigator will be described by way of example. FIG. 1 is an exploded perspective view illustrating a structure of a general LCD device. Referring to FIG. 1, a reflection plate 22 is attached onto a bottom cover 20 to reflect light emitted from a light source to an LCD panel 40. A light guide plate 24 is disposed on the reflection plate 22, and a lamp 26 which is the light source is arranged at one side of the light guide plate 24. In this structure, the light emitted from the lamp 26 enters the side of the light guide plate 24 and then is emitted to the front surface of the light guide plate 24.

Optical sheets 28 are arranged on the light guide plate 24. The optical sheets 28 improve efficiency of the light emitted from the reflection plate 22 and the light guide plate 24 and irradiate the light to the rear surface of the LCD panel 40. The optical sheets 28 include a diffusion sheet, a prism sheet, and a protective sheet.

A panel guide 30 is disposed above the optical sheets 28. The panel guide 30 includes a support frame supporting the edge of the LCD panel 40, and a frame sidewall downwardly extended from the support frame. The frame sidewall is provided with a fitting means, such as a hook, which fits the bottom cover 20 to a top cover 50. The optical sheets 28, the lamp 26, the light guide plate 24 and the reflection plate 22 are stably supported as the bottom cover 20 and the panel guide 30 are fixed to each other.

The LCD panel 40 is arranged on the panel guide 30 to display images. The top cover 50 is arranged on the LCD panel 40 and is provided with a display window that exposes an effective surface of the LCD panel 40, wherein images are formed in the effective surface. The top cover 50 is fixed to the frame sidewall of the panel guide 30. To irradiate the light to the rear of the LCD panel 40 which is not a light-emitting device, the lamp 26 should be connected to an inverter (not shown) arranged on the rear surface of the bottom cover 20 and thus should be supplied with a power source.

The lamp 26 is connected with the inverter through a wire 26a. A wire lead-out line is conventionally provided at one edge of the bottom cover 20, as shown in FIG. 2, to facilitate connection between the lamp 26 and the inverter. The wire lead-out line is provided with a groove or a hole for leading out the wire 26a, wherein the groove or the hole is formed at one edge of the bottom cover 20. The wire holder 25 is inserted into the groove or the hole to prevent disconnection of the wire 26a and short circuiting due to the disconnection from being generated.

However, the wire lead-out line, as shown in FIG. 2, has a structure where the wire holder 25 is simply inserted into the groove or the hole of the bottom cover 20 to cover the groove or the hole so that the wire 26a is naturally lead out to the hole or the groove. Accordingly, if the LCD device moves, the wire 26a also moves, causing contact or friction between the wire 26a and the optical sheets 28 adjacent to the wire 26a. For this reason, the optical sheets 28 may be wrinkled. This may cause uneven luminance and deteriorate luminance. Also, a problem occurs in that light may leak to the wire lead-out line for insertion and lead-out of the wire.

SUMMARY OF THE INVENTION

Therefore, an object of the present invention is to provide a wire holder and an LED device having the same, in which the wire holder stably supports a wire between a lamp and an inverter to minimize potential short circuiting of the wire and to minimize interference between the wire and optical sheets.

To achieve these and other advantages and in accordance with the purpose present invention, as embodied and broadly described herein, there is provided an LCD device which comprises a bottom cover having a bottom and lateral sides extended from the bottom, provided with a groove formed by partially cutting the bottom and the lateral sides at the edge, a light guide plate received in the bottom cover, a lamp arranged between one side of the light guide plate and one side of the bottom cover, a wire connected to both ends of the lamp and extended along the side of the bottom cover to be collected in the groove, a wire holder to which the wire is inserted to collect the wire in the grove, limiting motion of the wire, and an LCD panel arranged on the light guide plate.

In another aspect of the present invention, there is provided a wire holder which comprises a main body provided with a wire groove, a protrusion projected from the main body to –x axis direction, and a holder clamp protruded from the main body and the protrusion to −z axis direction and provided with a fitting groove around the circumference.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
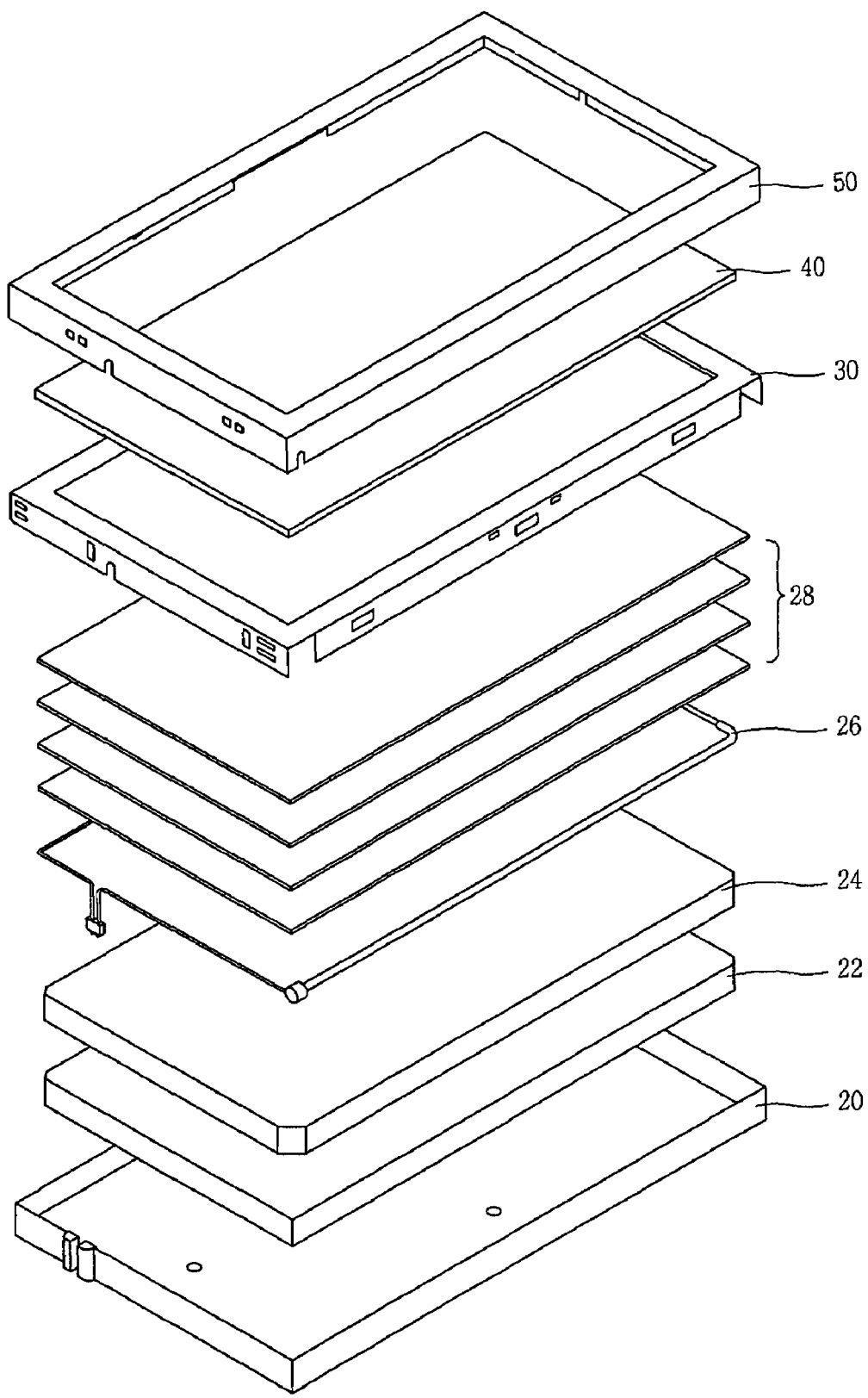
FIG. 1 is an exploded perspective view illustrating a structure of a general LCD device.
Figure 2:
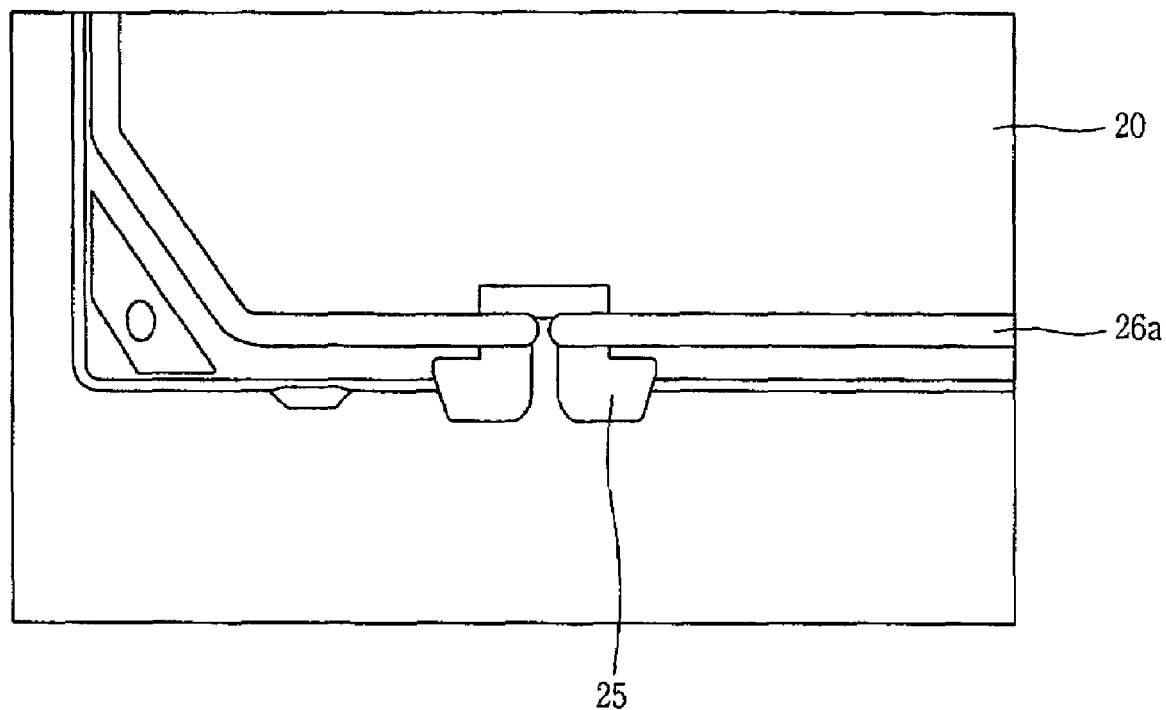
FIG. 2 illustrates a wire lead-out line on a bottom cover shown in FIG. 1.
Figure 3:
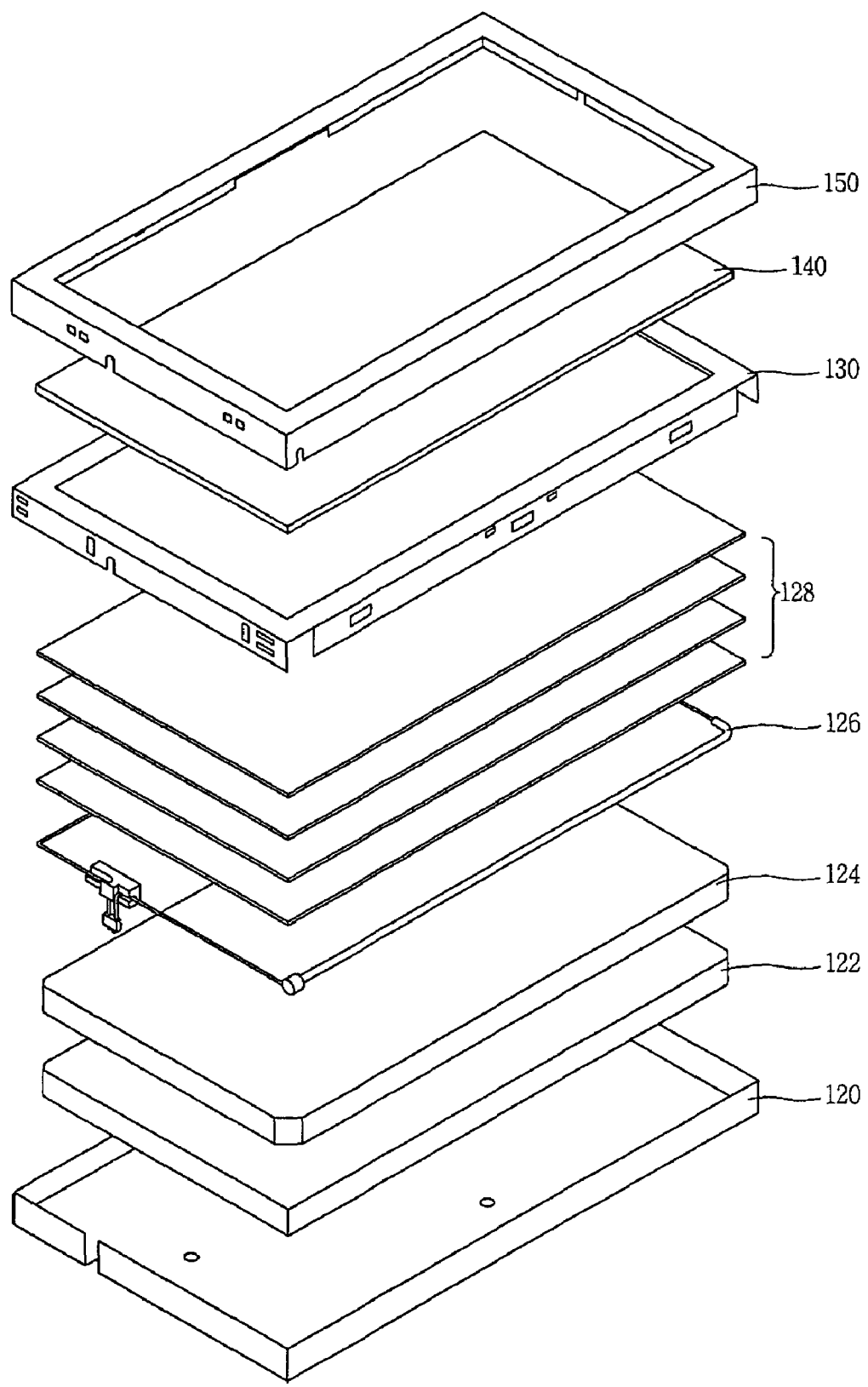
FIG. 3 is an exploded perspective view illustrating an LCD device according to the present invention.

A wire holder and an LCD device having the same according to one embodiment of the present invention will be described with reference to FIG. 3. FIG. 3 is an exploded perspective view illustrating an LCD device according to the present invention.

As shown in FIG. 3, a bottom cover 120 includes a bottom and lateral sides, wherein the bottom has a rectangular shape with long sides and short sides, and the lateral sides are upwardly extended from each side. In this case, four sides are connected to one another, any one side of the four sides has an opened or cut section. That is, as illustrated in FIG. 3, one of the sides extended from the short sides of the bottom is opened. A portion of bottom corresponding to the opened side is also cut. In other words, a groove or a hole formed by partially cutting the bottom and the sides is provided at one edge of the bottom cover 120. A wire 126a (see FIG. 4) will be inserted into the groove or the hole.

A reflection plate 122 is attached onto the bottom cover 120 to reflect light, which is emitted to an opposite side of an LCD panel 140, to the LCD panel 140.

A light guide plate 124 is disposed on the reflection plate 122, and a lamp 126 which is the light source is arranged at one side of the light guide plate 124. That is, the lamp 126 is disposed between one side of the light guide plate 124 and one side of the bottom cover 120. The lamp 126 is spaced apart from the one side of the light guide plate 124 at a predetermined interval. Although not shown, a lamp reflector may be provided between the lamp 126 and the one side of the bottom cover 120 to reflect the light emitted from the lamp 126 to the one side of the light guide plate 124. By this structure, the light emitted from the lamp 126 enters the side of the light guide plate 124 and then is emitted to the front surface of the light guide plate 124.

The lamp 126 includes a lamp body generating light and a wire 126a (see FIG. 4) connected with a lamp electrode provided at both ends of the lamp body. The wire 126a is connected to an inverter (not shown) generating a lamp driving source and thus supplies the lamp driving source to the lamp body. The wire 126a includes a high voltage wire connected to one end of the lamp body and applied with a high voltage from the inverter and a low voltage wire connected to the other end of the lamp body and applied with a low voltage from the inverter. The high voltage wire and the low voltage wire are extended along the side of the bottom cover 120 and are collected in the hole or the groove. Meanwhile, a lead-out structure of the wire 126a of the lamp 126 for connecting to the inverter will be described with reference to FIG. 4, FIG. 5A and FIG. 5B.

Optical sheets 128 are arranged on the light guide plate 124. The optical sheets 128 improve efficiency of the light emitted from the reflection plate 122 and the light guide plate 124 and irradiate the light to the rear surface of the LCD panel 140. The optical sheets 128 include a diffusion sheet, a prism sheet, and a protective sheet.

A panel guide 130 is disposed above the optical sheets 128. The panel guide 130 includes a support frame supporting the edge of the LCD panel 140, and a frame sidewall downwardly extended from the support frame. The frame sidewall is provided with a fitting means, such as a hook, which fits the bottom cover 120 to a top cover 150. The optical sheets 128, the lamp 126, the light guide plate 124 and the reflection plate 122 are stably supported as the bottom cover 120 and the panel guide 130 are fixed to each other.

The LCD panel 140 is arranged on the panel guide 130 to display images. The top cover 150 is arranged on the LCD panel 140 and is provided with a display window that exposes an effective surface of the LCD panel 140, wherein images are formed in the effective surface. The top cover 150 is fixed to the frame sidewall of the panel guide 130. To irradiate the light to the rear of the LCD panel 140 which is not a light-emitting device, the lamp 126 should be connected to the inverter (not shown) arranged on the rear surface of the bottom cover 120 and thus should be supplied with a power source.

Figure 4:
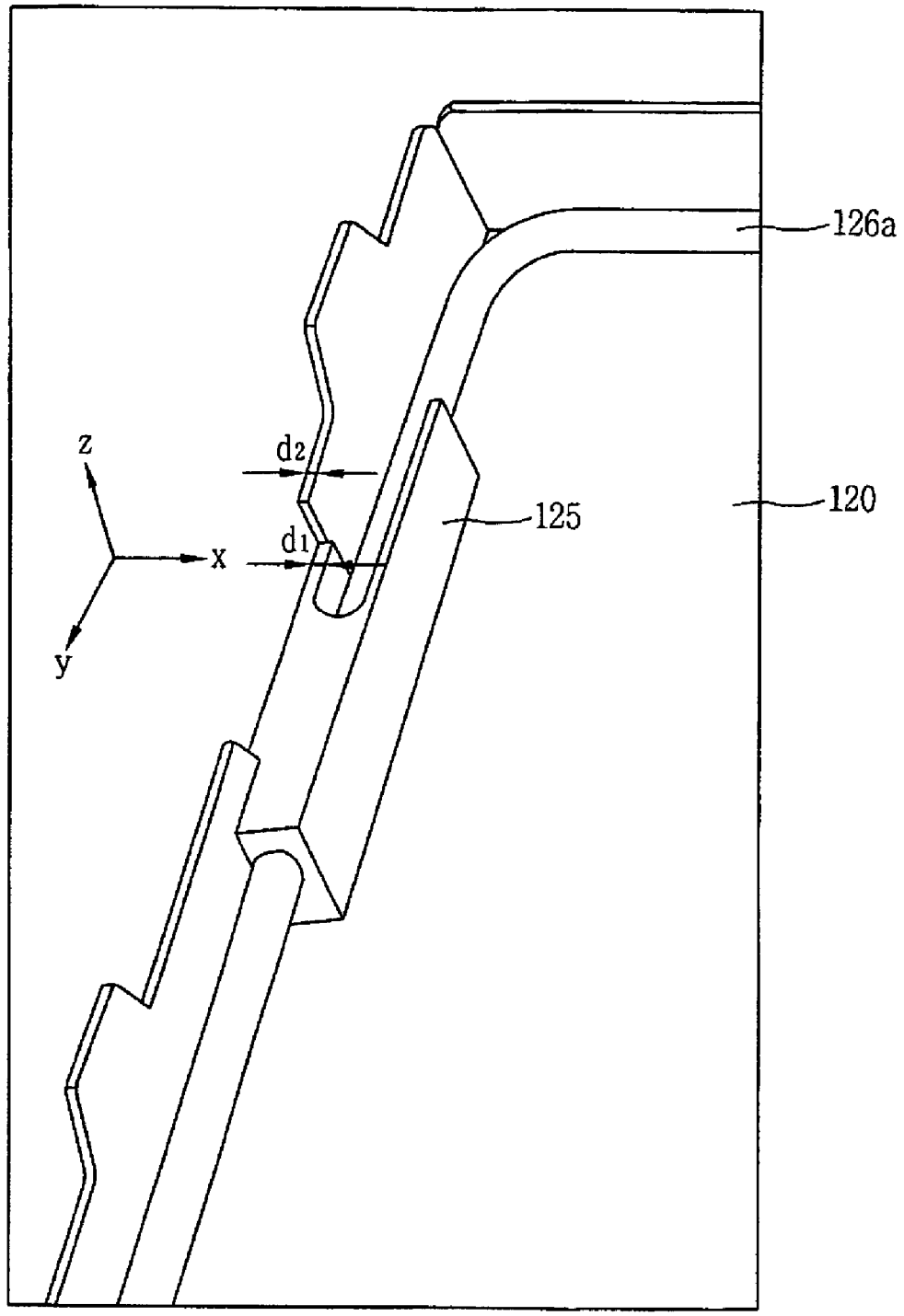
FIG. 4 illustrates a coupling structure of a bottom cover and a wire FIG. 3.
Figure 5A:
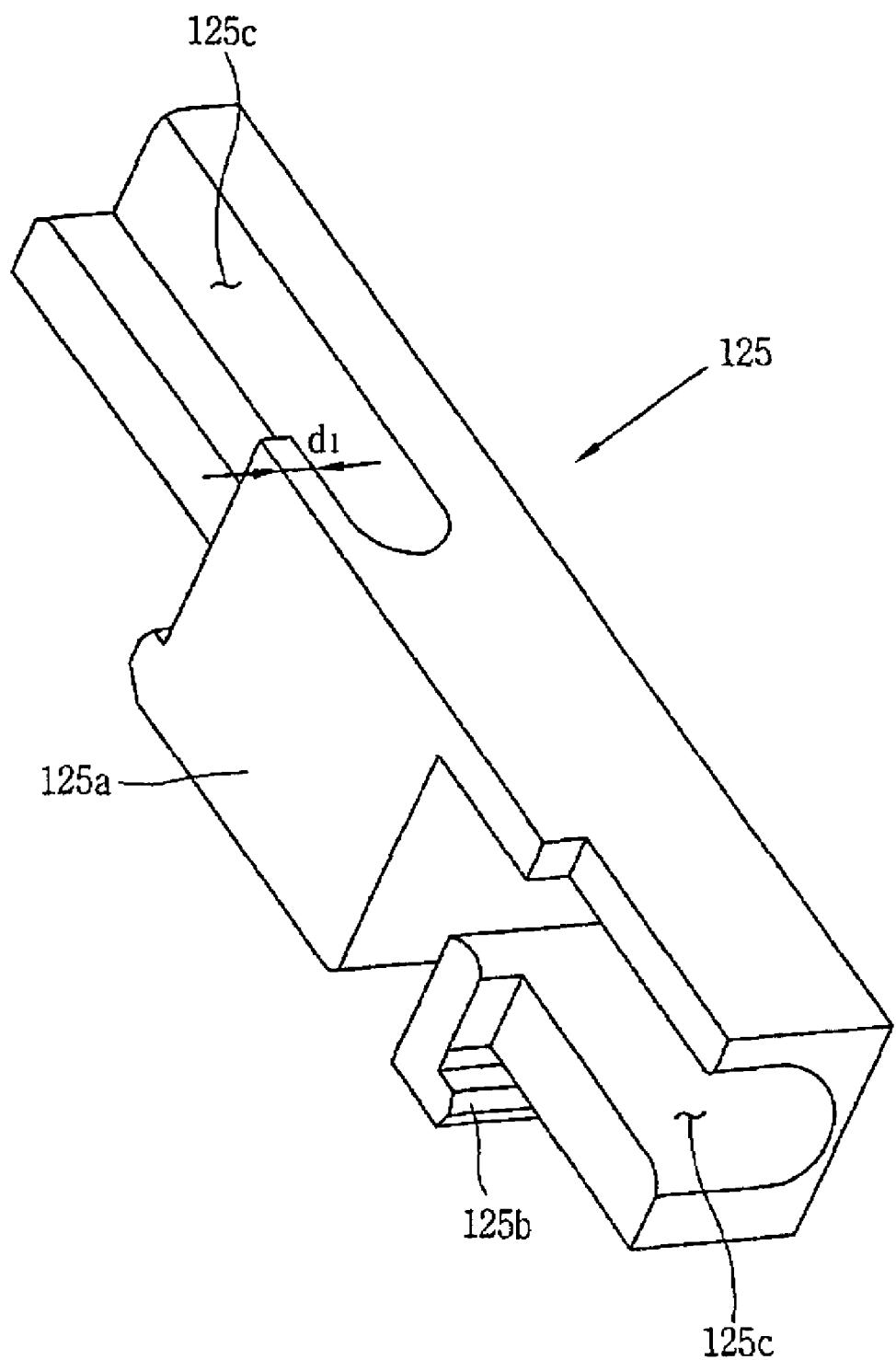
FIG. 5A is a front perspective view illustrating a wire holder shown in FIG. 4.
Figure 5B:
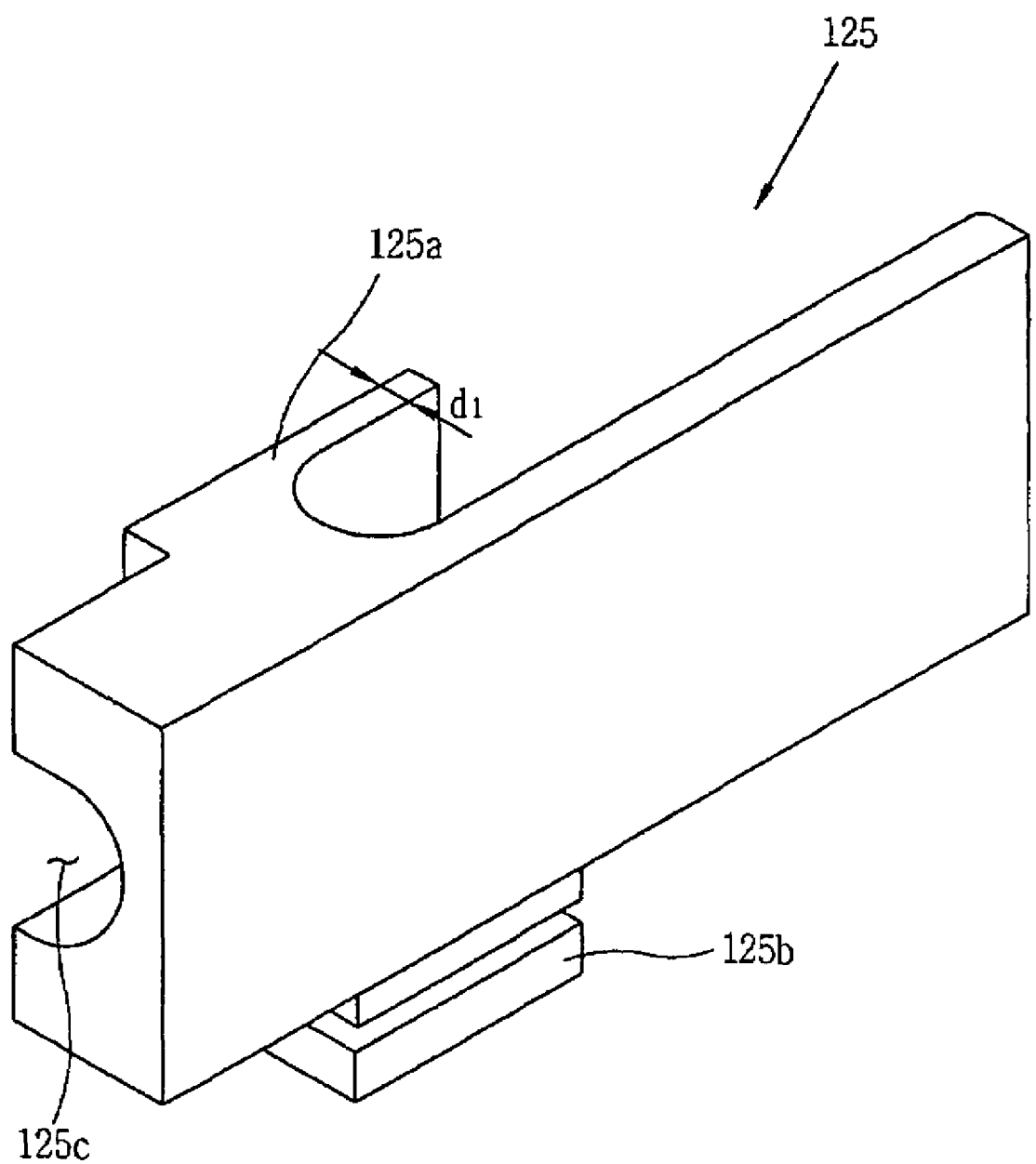
FIG. 5B is a rear perspective view illustrating a wire holder shown in FIG. 4.

FIG. 4 illustrates a lead-out structure of the wire 126a connected to the lamp 126, FIG. 5A is a front perspective view illustrating a wire holder 125 of FIG. 4, viewed from the front in X axis direction, and FIG. 5B is a rear perspective view illustrating the wire holder 125, viewed from the rear in −X axis direction. As shown, the hole or the groove formed by partially cutting the side and the bottom is provided at one edge of the bottom cover 120. The wire holder 125 is fixed to the hole or the groove.

The wire holder 125 according to the present invention includes a main body, a protrusion 125a extending from the main body to a lateral direction of the bottom cover 120 where the wire holder 125 is fixed to the bottom cover 120, and a holder clamp 125b extending from the main body and the protrusion 125a to the bottom of the bottom cover 120 and provided with a fitting groove to which the bottom is inserted.

The main body longitudinally extends along the side of the bottom cover 120 in comparison with the conventional wire holder. A wire groove 125c to which the wire 126a is inserted is formed in the extension portion of the main body. In other words, the main body is extended to an edge area of the bottom cover 120. This is to allow the wire 126a connected to the lamp 126 to curve naturally along the inner edge of the bottom cover 120 and at the same time to prevent the wire 126a from being moved in both directions (x and −x directions). Meanwhile, a portion of the main body, which is oriented toward the z direction, is partially cut to form an opened shape. This is to allow the wire to be easily fixed to the wire groove 126c.

The protrusion 125a is provided in −x direction from the main body. The protrusion 125a has the substantially same shape as that of the cut portion provided at the side of the bottom cover 120. That is, the protrusion 125a has the substantially same size as that of the cut portion of the side of the bottom cover 120. Specifically, the protrusion 125a has the substantially same width as that of the side cut portion of the bottom cover 120. Thus, when the wire holder 125 is fixed to the bottom cover 120, the sides of the bottom cover 120 are all covered without opened section, so that light leakage is avoided. Also, the protrusion 125a is inserted into the cut portion at the side of the bottom cover 120 so that the bottom cover 120 is fixed firmly to the wire holder 125 and the durability of the bottom cover 120 is improved. In one aspect, the protrusion 125a has a thickness d1 equal to a side thickness d2 of the bottom cover 120. This is to smoothly fix the panel guide to the protrusion 125a.

The holder clamp 125b, as shown in FIG. 5A and FIG. 5b, extends from the main body and the protrusion 125a to the bottom of the bottom cover 120, and is provided with a fitting groove to which the bottom is inserted. The fitting groove is provided around the holder clamp 125b, and has the substantially same width as the bottom thickness of the bottom cover 120 so that the bottom of the bottom cover 120 is partially inserted into the fitting groove. The wire holder 125 is fixed to the bottom of the bottom cover 120 through the holder clamp 125b. The wire 126a is inserted into the wire holder 125 and then is extended along the wire groove 125c so that the wire is inserted into the groove provided in the bottom cover 120. As the wire 126a is inserted into the groove of the bottom cover 120, the wire 126a is limited in motion to y and −y directions.

Figure 6:
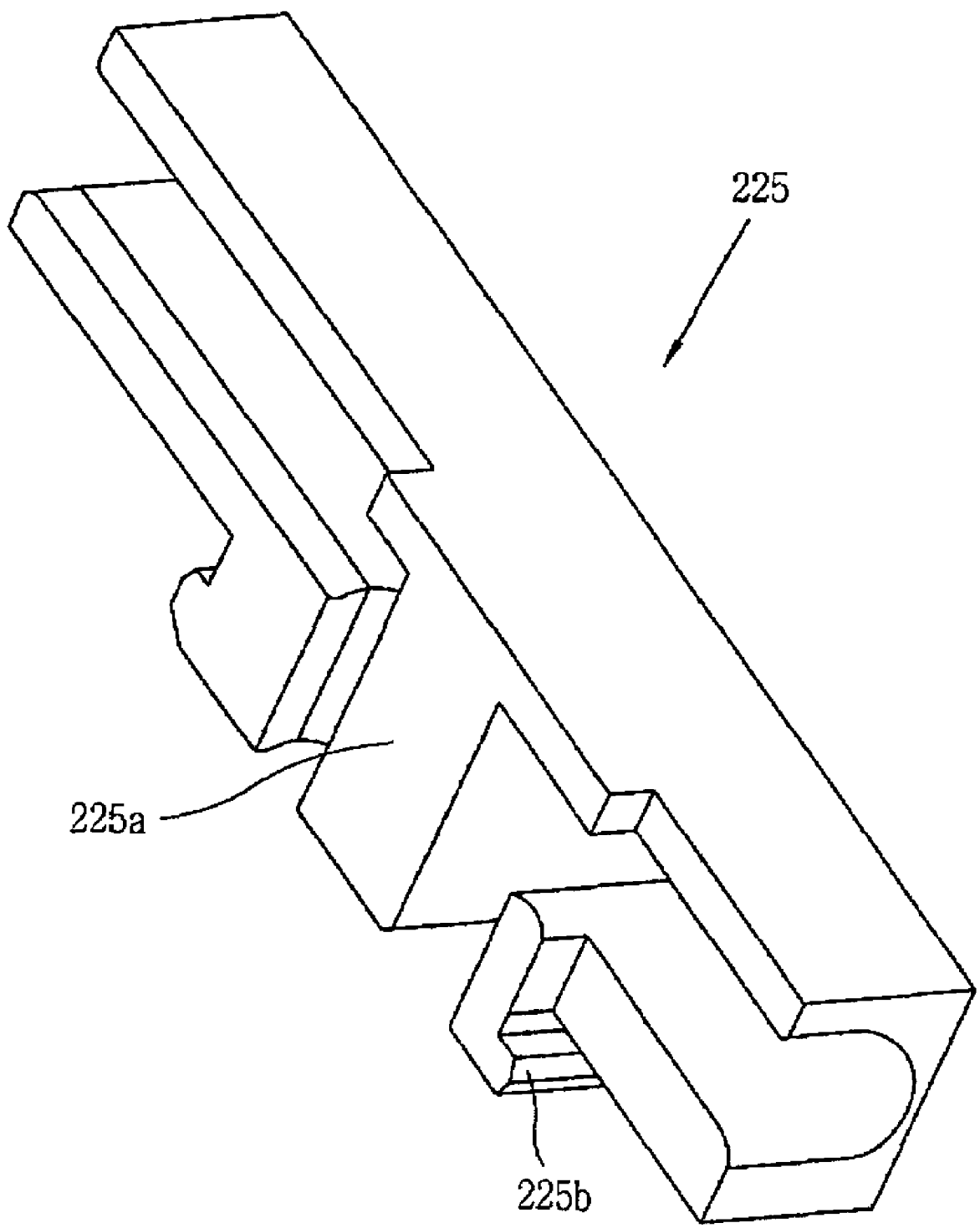
FIG. 6 is a front perspective view illustrating a wire holder according embodiment of the present invention.

FIG. 6 illustrates a wire holder 225 according to another embodiment of the present invention. The wire holder 225 has a symmetrical structure around a protrusion 225a. However, in one exemplary aspect a left portion of the wire holder 225 oriented toward the edge area of the bottom cover is formed more longitudinally.

Also, the wire groove 125c extended from the bottom to the side is formed in the protrusion 225a formed in a front side of the wire holder 225. In this case, motion of two-stranded wires to an upward direction (z direction, see FIG. 4) does not occur and thus a problem of light leakage is solved. The holder clamp 225b extended to the protrusion 225a is the same as the aforementioned holder clamp 125b.

Meanwhile, the wire holders 125 and 225 according to the present invention are preferably formed of polycarbonate (PC) having heat-resistance, acid-resistance, light-resistance and rigid insulation.

Also, the wire holders 125 and 225 can be processed from a mold die having a certain pattern as an injection molding product of polycarbonate.

In the LCD device according to the present invention, wrinkle of the optical sheets due to motion of the lamp wire can be solved, and light leakage occurring in the lead-out space for the wire can be avoided, thereby improving reflection efficiency of the light.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An LCD device comprising:
    a bottom cover having a bottom and lateral sides extending from the bottom, provided with a groove in the bottom and the lateral sides at the edge;
    a light guide plate received in the bottom cover;
    a lamp arranged between one side of the light guide plate and one side of the bottom cover;
    a wire connected to both ends of the lamp and extended along the side of the bottom cover to be collected in the groove;
    a wire holder to which the wire is inserted to collect the wire in the groove, limiting motion of the wire, the wire holder being disposed at the inner side surface, a part of the lower surface of the bottom cover being inserted to the wire holder to disposed the wire holder thereto, thereby the wire holder holds the wire arranged along the inner peripheral region of the bottom; and
    an LCD panel arranged on the light guide plate,
    wherein the wire holder includes a main body, a protrusion protruded from the main body to be perpendicular to the groove, and a holder clamp extending from the main body to be perpendicular to the groove and the protrusion,
    wherein the side surface of the bottom cover is partially cut and the size of the cut portion is substantially same as size of the width of the protrusion so that the protrusion is inserted to the cut portion of the bottom cover to assemble the protrusion with the bottom cover.

2. The LCD device as claimed in claim 1, wherein the protrusion has the substantially same thickness as a side thickness of the bottom cover.

3. The LCD device as claimed in claim 1, wherein the main body is provided with a wire groove to which the wire is inserted.

4. The LCD device as claimed in claim 1, wherein the main body has one end extended to adjoin the edge of the bottom cover.

5. The LCD device as claimed in claim 1, wherein the wire holder is formed of polycarbonate (PC).

6. The LCD device as claimed in claim 1, wherein the main body in z direction has one side cut to expose a portion of the wire groove.

7. A wire holder for holding a wire in a liquid crystal display device, the wire holder comprising:
    a main body provided with a wire groove in which the wire is inserted;
    a protrusion projected from the main body, the protrusion being extended to be perpendicular to the wire groove, the protrusion being inserted to a cut portion of a bottom cover of the liquid crystal display device; and
    a holder clamp protruded from the main body and the protrusion, the holder clamp being extended to be perpendicular to the wire groove and the protrusion, the holder clamp including a fitting groove into which the lower surface of the bottom cover is inserted.

8. The wire holder as claimed in claim 7, wherein the wire holder is formed of polycarbonate (PC).

9. The wire holder as claimed in claim 7, wherein the main body in z direction has one side cut to expose a portion of the wire groove.

10. The LCD device as claimed in claim 7, wherein the main body is extended to the corner of the bottom cover to curve smoothly the wire at the corner of the bottom cover.

* * * * *